United States Patent
Kim et al.

(10) Patent No.: US 10,338,819 B2
(45) Date of Patent: Jul. 2, 2019

(54) CONTROLLER TRANSMITTING OUTPUT COMMANDS AND METHOD OF OPERATING THE SAME

(71) Applicant: SK hynix Inc., Gyeonggi-do (KR)

(72) Inventors: Do Hun Kim, Gyeonggi-do (KR); Hyoun Ju Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 488 days.

(21) Appl. No.: 14/844,988

(22) Filed: Sep. 3, 2015

(65) Prior Publication Data

US 2016/0299687 A1 Oct. 13, 2016

(30) Foreign Application Priority Data

Apr. 13, 2015 (KR) .......................... 10-2015-0051909

(51) Int. Cl.
*G06F 3/06* (2006.01)
*G06F 3/12* (2006.01)
*G06F 13/16* (2006.01)

(52) U.S. Cl.
CPC ............ *G06F 3/061* (2013.01); *G06F 3/0659* (2013.01); *G06F 3/0679* (2013.01); *G06F 3/1208* (2013.01); *G06F 13/161* (2013.01)

(58) Field of Classification Search
CPC ...... G06F 3/061; G06F 3/1208; G06F 13/161; G06F 3/679
USPC ........................................................... 710/5
See application file for complete search history.

(56) References Cited

U.S. PATENT DOCUMENTS

| | | | |
|---|---|---|---|
| 2002/0028657 A1* | 3/2002 | Davies | H04B 1/713 455/41.2 |
| 2003/0051081 A1* | 3/2003 | Maeda | G06F 3/0613 710/20 |
| 2005/0278391 A1* | 12/2005 | Spear | G06F 11/2069 |
| 2006/0148063 A1* | 7/2006 | Fauzzi | G01N 1/31 435/286.4 |
| 2007/0233923 A1* | 10/2007 | Lee | G06F 13/362 710/116 |
| 2009/0019243 A1* | 1/2009 | Hur | G06F 1/3225 711/158 |
| 2010/0106873 A1* | 4/2010 | Funakura | G06K 7/0008 710/106 |

(Continued)

FOREIGN PATENT DOCUMENTS

| | | |
|---|---|---|
| KR | 1020060116729 | 11/2006 |
| KR | 101363422 | 2/2014 |

*Primary Examiner* — Getente A Yimer
(74) *Attorney, Agent, or Firm* — IP & T GROUP LLP

(57) ABSTRACT

A controller includes a host command sensor suitable for generating a target ratio between first typed host commands and second typed host commands; an output command generator suitable for generating first and second typed output commands respectively corresponding to the first and second typed host commands; and an arbiter suitable for sequentially transmitting the first and second typed output commands from the output command queue to a channel, and generating a channel ratio between first and second typed output commands transmitted from the output command queue to the channel. The arbiter transmits one of the first and second typed output commands from the output command queue to the channel by comparing the channel ratio with the target ratio.

20 Claims, 10 Drawing Sheets

(56) References Cited

U.S. PATENT DOCUMENTS

2011/0055671 A1* 3/2011 Kim .................. G06F 11/1028
 714/800
2012/0221767 A1 8/2012 Post et al.
2014/0067233 A1* 3/2014 Nishida .................. F02D 41/20
 701/103

* cited by examiner

CONTROLLER TRANSMITTING OUTPUT COMMANDS AND METHOD OF OPERATING THE SAME

CROSS-REFERENCE TO RELATED APPLICATION

The present application claims priority to Korean patent application number 10-2015-0051909, filed on Apr. 13, 2015, in the Korean Intellectual Property Office, the entire disclosure of which is herein incorporated by reference in its entirety.

BACKGROUND

1. Field

Embodiments of the present invention relate to an electronic device, and more particularly, to a controller transmitting output commands through a channel and a method of operating the same.

2. Description of the Related Art

Semiconductor devices often include slave devices. A slave device may be provided as a function block for performing specific operations. The slave device can be a nonvolatile memory device or a volatile memory device.

A controller is provided to interface between the slave device and a host. The controller receives commands from the host. The controller accesses the slave device based on the host commands, and provides the host with an access result as a response to each host command. The host performs internal operations based on the access result.

When the access result is quickly fed back to the host in response to the host commands, the performance of the host is improved. When the access result is fed back to the host in response to each host command with the same timing, the performance of the host is also improved.

SUMMARY

Embodiments provide a controller capable of quickly responding to a host.

According to an embodiment of the present invention, there is provided a controller including: a host command receiver suitable for receiving first and second typed host commands from a host; a host command sensor suitable for generating a target ratio between first typed host commands and second typed host commands; an output command generator suitable for generating first and second typed output commands respectively corresponding to the first and second typed host commands; an output command queue suitable for enqueueing the first and second typed output commands; and an arbiter suitable for transmitting the first and second typed output commands from the output command queue to a channel, and generating a channel ratio between first and second typed output commands transmitted from the output command queue to the channel, wherein the arbiter transmits one of the first and second typed output commands from the output command queue to the channel by comparing the channel ratio with the target ratio.

The arbiter may transmit the first typed output command from the output command queue to the channel when a proportion of the first typed output command of the channel ratio is lower than a proportion of the first typed host command of the target ratio.

The arbiter may transmit the second typed output command from the output command queue to the channel when a proportion of the second typed output command of the channel ratio is lower than a proportion of the second typed host command of the target ratio.

The arbiter may transmit one of the first and second typed output commands from the output command queue to the channel such that the difference between the target ratio and the channel ratio decreases.

The channel may be connected to one or more semiconductor memory devices. The first typed output command may correspond to reading with respect to the semiconductor memory devices, and the second typed output command may correspond to programming with respect to the semiconductor memory devices.

The arbiter may include an output command selection unit suitable for sequentially transmitting the first and second typed output commands from the output command queue to the channel; an output command sensing unit suitable for generating the channel ratio by monitoring the output commands transmitted from the output command queue to the channel; and a type selection unit suitable for selecting one of the first and second output commands by comparing the channel ratio with the target ratio, wherein the output command selection unit transmits one of the first and second typed output commands from the output command queue to the channel based on the selection of the type selection unit.

The type selection unit may select the first typed output command when a proportion of the first typed output command of the channel ratio is lower than a proportion of the first typed host command of the target ratio.

The type selection unit may select the second typed output command when a proportion of the second typed output command of the channel ratio is lower than a proportion of the second typed host command of the target ratio.

The output command sensing unit may include a sensing queue; and a queue control unit suitable for enqueueing the output commands, which are transmitted from the output command queue to the channel, to the sensing queue, and dequeueing one of the output commands enqueued in the sensing queue when a number of output commands enqueued in the sensing queue is greater than a predetermined number, wherein the queue control unit increases a first count value when the enqueued output command is the first typed output command, increases a second count value when the enqueued output command is the second typed output command, decreases the first count value when the dequeued output command is the first typed output command, and decreases the second count value when the dequeued output command is the second typed output command.

The queue control unit may generate the channel ratio based on the first and second count values.

The output command selection unit may include a hysteresis block suitable for generating hysteresis type information based on the selection of the type selection unit; and an output command selector suitable for transmitting one of the first and second typed output commands from the output command queue to the channel according to the hysteresis type information, wherein the hysteresis block increases a first hysteresis count when the first typed output command is transmitted from the output command queue to the channel, and increases a second hysteresis count when the second typed output command is transmitted from the output command queue to the channel, and wherein the hysteresis block generates the hysteresis type information representing one of the first and second output commands selected by the type selection unit when each of the first and second hysteresis counts is less than or equal to a critical value, generates the hysteresis type information representing the second typed output command when the first hysteresis count is greater than the critical value, and generates the hysteresis type information representing the first typed output command when the second hysteresis count is greater than the critical value.

When one of the first and second hysteresis counts becomes greater than the critical value, the hysteresis block may increase a first reset count when the first typed output command is transmitted from the output command queue to the channel, and increase a second reset count when the second typed output command is transmitted from the output command queue to the channel, and wherein the hysteresis block may reset the first and second hysteresis counts when one of the first and second reset counts reaches a reference value.

According to an embodiment of the present invention, there is provided a controller including: a host command receiver suitable for receiving various typed host commands from a host; a host command sensor suitable for generating a target ratio of each typed host commands to the various typed host commands; an output command queue suitable for enqueueing various typed output commands respectively corresponding to the various typed host commands; and an arbiter suitable for transmitting the various typed output commands from the output command queue to a channel, and generating a channel ratio of each typed output commands to the various typed output commands transmitted from the output command queue to the channel, wherein the arbiter transmits one of the various typed output commands from the output command queue to the channel by comparing the channel ratio with the target ratio.

The arbiter may transmit a first typed output command from the output command queue to the channel when a proportion of the first typed output command of the channel ratio is lower than a proportion of the first typed host command of the target ratio.

The arbiter may transmit one of the various typed output commands from the output command queue to the channel such that the difference between the target ratio and the channel ratio decreases.

The channel may be connected to one or more semiconductor memory devices. The various typed output commands may include a first typed output command corresponding to reading with respect to the semiconductor memory devices, and a second typed output command corresponding to programming with respect to the semiconductor memory devices.

The arbiter may include: an output command selection unit suitable for sequentially transmitting the various typed output commands from the output command queue to the channel; an output command sensing unit suitable for generating the channel ratio by monitoring each typed output command transmitted from the output command queue to the channel; and a type selection unit suitable for selecting one of the various typed output commands by comparing the channel ratio with the target ratio, wherein the output command selection unit transmits one of the various typed output commands from the output command queue to the channel based on the selection of the type selection unit.

The type selection unit may select a first typed output command when a proportion of the first typed output command of the channel ratio is lower than a proportion of a first typed host command of the target ratio.

The output command selection unit may include: a hysteresis block suitable for generating hysteresis type information based on the selection of the type selection unit; and an output command selector suitable for transmitting one of the various typed output commands from the output command queue to the channel according to the hysteresis type information, wherein the hysteresis block increases each of the hysteresis counts corresponding to the various typed output commands when each typed output command is transmitted from the output command queue to the channel, and wherein the hysteresis block generates the hysteresis type information representing one of the various typed output commands selected by the type selection unit when each of the hysteresis counts is less than or equal to a critical value, and generates the hysteresis type information representing a second typed output command when one of the hysteresis counts corresponding to a first typed output command is greater than the critical value.

According to an embodiment of the present invention, there is provided a method of operating a controller, the method including: receiving various typed host commands from a host; generating a target ratio of each typed host commands to the various typed host commands; enqueueing various typed output commands respectively corresponding to the various typed host commands; transmitting the various typed output commands from the output command queue to a channel; and generating a channel ratio of each typed output commands to the various typed output commands transmitted from the output command queue to the channel, wherein the transmitting of the various typed output commands transmits one of the various typed output commands from the output command queue to the channel by comparing the channel ratio with the target ratio.

According to embodiments of the present invention, the controller may swiftly respond to the host.

DETAILED DESCRIPTION

Figure 1:
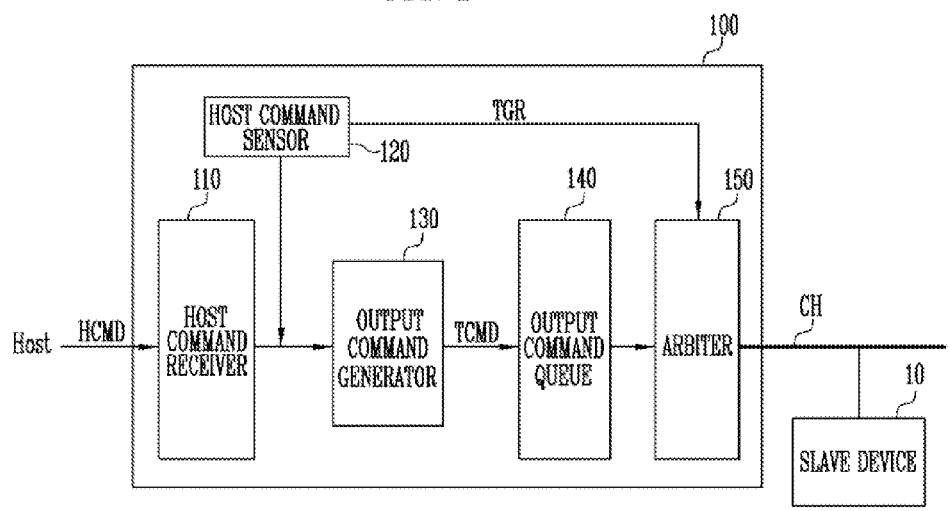
FIG. 1 is a block diagram illustrating a controller according to an embodiment of the present invention.

Embodiments will now be described more fully with reference to the accompanying drawings; however, as those skilled in the art would realize, the invention may be embodied in different forms and should not be construed as limited to the embodiments set forth herein.

In the drawing figures, dimensions may be exaggerated for clarity. It will be understood that when an element is referred to as being "between" two elements, it can be the only element between the two elements, or one or more intervening elements may also be present. Like reference numerals refer to like elements throughout.

In the specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include other components.

FIG. 1 is a block diagram illustrating a controller 100 according to an embodiment of the present invention.

Referring to FIG. 1, the controller 100 may be connected between a host HOST and a slave device 10. The controller 100 may receive host commands HCMD from the host HOST. The controller 100 may control the slave device 10 based on the host commands HCMD. The controller 100 may access the slave device 10 according to each host command, and provide the host HOST with an access result as a response to the corresponding host command. More specifically, the controller 100 may provide output commands TCMD to the slave device 10 according to the host commands HCMD, may receive access results corresponding to the output commands TCMD from the slave device 10, and may provide the host HOST with the access results as responses corresponding to the host commands HCMD.

The host HOST may provide various types of host commands HCMD for accessing the slave device 10. In an embodiment, when the slave device 10 is a semiconductor memory device, the host HOST may transmit a host read command for reading data stored in the semiconductor memory device. Also, the host HOST may transmit a host program command for writing data in the semiconductor memory device. In addition, it will be understood that there are various types of host commands HCMD other than the host read and program commands.

Hereinafter, for convenience, it is assumed that the host commands HCMD include first typed host commands and second typed host commands. Also, it is assumed that the output commands TCMD include first typed output commands, which correspond to the first typed host commands, and second typed output commands, correspond to the second typed host commands.

The controller 100 may include a host command receiver 110, a host command sensor 120, an output command generator 130, an output command queue 140, and an arbiter 150.

The host command receiver 110 may receive host commands HCMD from the host HOST. The host command receiver 110 may include a protocol for communicating with the host HOST. The host command receiver 110 may transfer the host commands HCMD to the output command generator 130.

The host command sensor 120 monitors the host commands HCMD transmitted from the host command receiver 110 to the output command generator 130. The host command sensor 120 may generate a target ratio TGR between the first typed host commands and the second typed host commands. That is, the host command sensor 120 may generate the target ratio TGR, which is a ratio among the various types of the host commands HCMD. The host command sensor 120 may provide the target ratio TGR to the arbiter 150.

For example, whenever each of the host commands HCMD is provided, the host command sensor 130 may count first and second count values respectively corresponding to the first and second types. For example, the host command sensor 120 may increase the first count value in response to each reception of the first typed host command. Also, the host command sensor 120 may increase the second count value in response to each reception of the second typed host command. The host command sensor 120 may generate the target ratio TGR according to the first and second count values.

FIG. 1 exemplarily shows the host command sensor 120 separated from the host command receiver 110 or the output command generator 130. The host command sensor 120 may be included in the host command receiver 110 or the output command generator 130.

The output command generator 130 may control overall operations of the controller 100. The output command generator 130 may be connected between the host command receiver 110 and the output command queue 140. The output command generator 130 may generate the output commands TCMD according the host commands HCMD. The output command generator 130 may generate at least a single output command corresponding to a single host command. The output command generator 130 may generate the first and second typed output commands according to the first and second typed host commands respectively.

In an embodiment, when the slave device 10 is a semiconductor memory device, the output command generator 130 may generate an output read command for reading a page in the semiconductor memory device according to a host read command. Alternatively, the output command generator 130 may generate output program commands for programming one page in the semiconductor memory device according to a host program command.

The output command generator 130 may enqueue the output commands TCMD to the output command queue 140 in a first-in-first-out manner. In an embodiment, the output command queue 140 may be included in a memory such as a random access memory (RAM). The output commands TCMD enqueued in the output command queue 140 may be dequeued by the arbiter 150.

The arbiter 150 may be connected to the output command queue 140. The arbiter 150 may receive the target ratio TGR from the host command sensor 120. The arbiter 150 may output the enqueued output commands TCMD to the slave device 10 through a channel CH.

According to an embodiment of the present invention, the arbiter 150 may generate a channel ratio CHR between the first and second typed output commands transmitted through the channel CH. That is, the arbiter 150 may generate the channel ratio CHR, which is a ratio among various types of the output commands, which are previously transmitted through the channel CH. The arbiter 150 may compare the channel ratio with the target ratio TGR, select one of the first and second types based on the comparison result, and transmit one of the selected types among the output commands enqueued in the output command queue 140 to the slave device 10 through the channel CH.

In an embodiment, the arbiter 150 may select the first type when a proportion of the first type of the channel ratio is lower than of the target ratio TGR. Also, the arbiter 150 may select the second type when a proportion of the second type of the channel ratio is lower than the target ratio TGR. The arbiter 150 may select one of the various types such that the difference between channel ratio and the target ratio TGR decreases.

When assuming that the arbiter 150 may sequentially output the output commands TCMD enqueued in the output command queue 140 without referring to the target ratio TGR, the process for a host command even with a priority among the host commands HCMD may be delayed. For example, if the output commands TCMD enqueued in the output command queue 140 are sequentially processed regardless of priority even when the first typed host command has the priority to be processed prior to the second typed host command, the host HOST may receive the access result corresponding to the first typed host command after a lot of time elapses. Therefore, the operating speed of the host HOST may be lowered.

Further, when assumed that the arbiter 150 processes the first typed output commands having priority to be processed prior to the second typed output command among the output commands TCMD enqueued in the output command queue 140 without referring to the target ratio TGR, as the host commands HCMD are continuously provided, the first typed output commands enqueued in the output command queue 140 may be processed prior to the second typed output commands and therefore the second typed output commands enqueued in the output command queue 140 may accrue. When the number of the second typed output commands enqueued in the output command queue 140 is greater than a specific reference value, the second typed output commands may be processed regardless of the priority of the first typed output commands. In this case, the host HOST may receive the access result corresponding to the first typed host command after a lot of time elapses. Therefore, the operating speed of the host HOST may be lowered.

According to an embodiment of the present invention, output commands may be transmitted to the channel CH with reference to the target ratio TGR. The type of the output command may be selected such that the difference between the channel ratio and the target ratio TGR decreases, and the output command of the selected type may be transmitted through the channel CH. Accordingly, the host HOST can quickly receive the access result corresponding to the host command of the selected type. Thus, the operating speed of the host HOST connected to the controller 100 may be improved.

Figure 2:
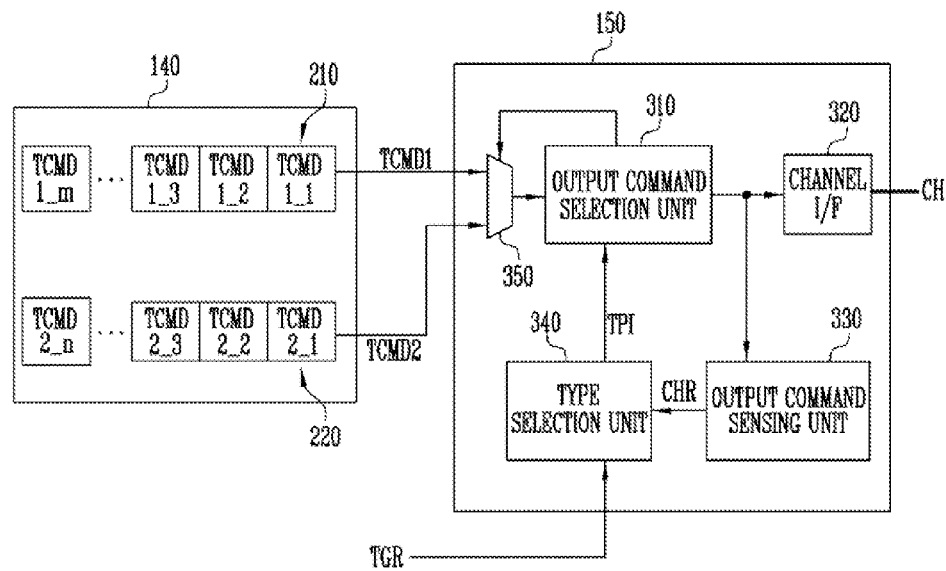
FIG. 2 is a block diagram illustrating an output command queue and an arbiter shown in FIG. 1.

FIG. 2 is a block diagram illustrating the output command queue 140 and the arbiter 150 shown in FIG. 1.

Referring to FIG. 2, the output command queue 140 may include a first output command queue 210 and a second output command queue 220. First to m-th first typed output commands TCMD_1 to TCMD_m may be enqueued in the first output command queue 210 by the output command generator 130, and dequeued to the arbiter 150 in the first-in-first-out manner. First to n-th second typed output commands TCMD2_1 to TCMD2_n may be enqueued in the second output command queue 220 by the output command generator 130, and dequeued to the arbiter 150 in the first-in-first-out manner.

The arbiter 150 may include an output command selection unit 310, a channel interface 320 an output command sensing unit 330, a type selection unit 340, and a switching unit 350.

The output command selection unit 310 may receive the first typed output command TCMD1 from the first output command queue 210 through the switching unit 350. For example, the first typed output command TCMD1 may correspond to a tail address of the first output command queue 210 among the first to m-th first typed output commands TCMD1_1 to TCMD1_m. The output command selection unit 310 may receive the second typed output command TCMD2 from the second output command queue 220 through the switching unit 350. For example, the second typed output command TCMD2 may correspond to a tail address of the second output command queue 220 among the first to n-th second typed output commands TCMD2_1 to TCMD2_n.

The output command selection unit 310 may transmit one of the first typed output command TCMD1 and the second typed output command TCMD2 to the channel CH through the channel interface CH. The channel interface 320 may include a protocol for communicating with the slave device 10 through the channel CH.

The output command sensing unit 330 may monitor the transmission of the output commands to the channel CH by the output command selection unit 310, and may generate the channel ratio CHR. The output command sensing unit 330 will be described in detail with reference to FIG. 3.

The type selection unit 340 may be connected to the output command sensing unit 330 and the output command selection unit 310. The type selection unit 340 may receive the channel ratio CHR from the output command sensing unit 330 and the target ratio TGR from the host command sensor 120. The type selection unit 340 may select one among of the various types, i.e. the first and second types, by comparing the channel ratio CHR with the target ratio TGR, and may output type information TPI, which indicates the selected type, to the output command selection unit 310. For example the type selection unit 340 may provide the type information TPI to the output command selection unit 310 in response to a control signal from the output command selection unit 310.

The type selection unit 340 may select one of the various types, for example, the first and second types, such that the difference between the channel ratio CHR and the target ratio TGR decreases. When a proportion of the first type of the channel ratio CHR is lower than of the target ratio TGR, the type selection unit 340 may select the first type. When a proportion of the second type of the channel ratio CHR is lower than of the target ratio TGR, the type selection unit 340 may select the second type.

According to the type information TPI from the type selection unit 340 indicating the selected type, the output command selection unit 310 may transmit one of the first typed output command TCMD1 and the second typed output command TCMD2, which is received from the output command queue 140 through the switching unit 350, to the channel CH through the channel interface 320. When the type information TPI indicates the first type, the output command selection unit 310 may control the switching unit 350 to dequeue the first typed output command TCMD1 from the first output command queue 210. When the type information TPI indicates the second type, the output command selection unit 310 may control the switching unit 350 to dequeue the second typed output command TCMD2 from the second output command queue 220. The output command selection unit 310 may transfer the dequeued output command to the channel CH through the channel interface 320.

Figure 3:
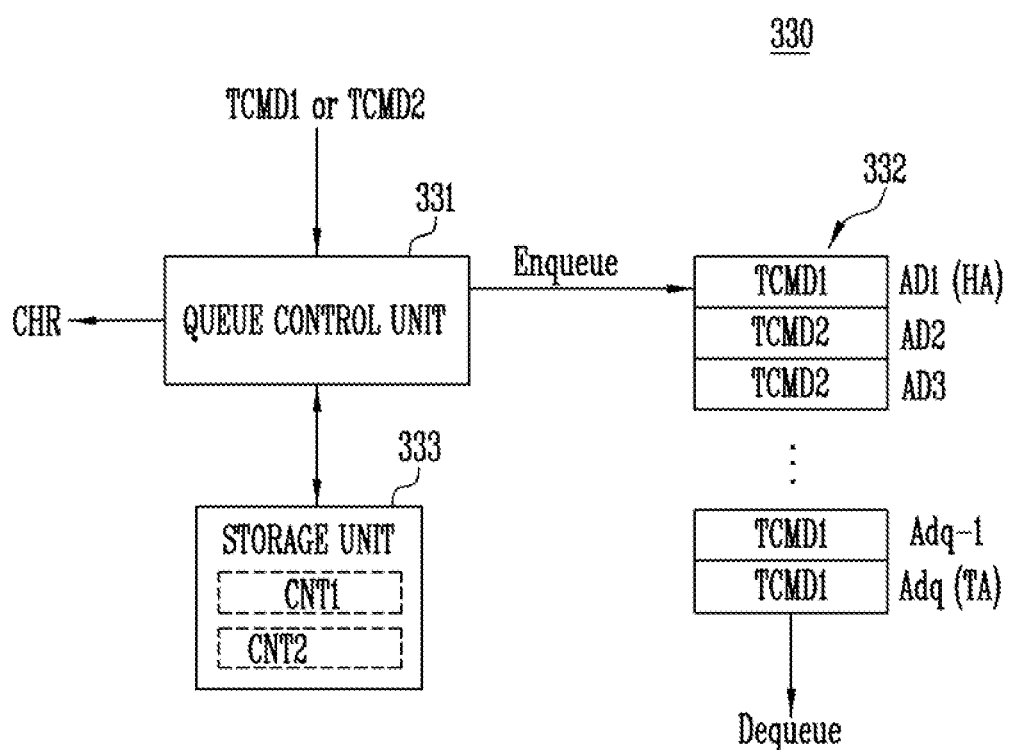
FIG. 3 is a block diagram illustrating an output command sensing unit shown in FIG. 2.

FIG. 3 is a block diagram illustrating the output command sensing unit 330 shown in FIG. 2.

Referring to FIG. 3, the output command sensing unit 330 may include a queue control unit 331, a sensing queue 332, and a counter storage unit 333.

Whenever the output command selection unit 310 transmits the output command, the queue control unit 331 may enqueue the output command, which is output from the output command selection unit 310, to the sensing queue 332 in the first-in-first-cut manner. Whenever the output command selection unit 310 transmits the output command to the channel CH, the transmitted output command may be one of the first typed output command TCMD1 and second typed output command TCMD2. The queue control unit 331 may enqueue the output command, which is output from the output command selection unit 310, to a head address HA of the sensing queue 332.

For example, a first address AD1 may be the head address HA, and a q-th address ADq may be the tail address TA. The output commands, which are output from the output command selection unit 310, may be enqueued in the sensing queue 332 having the q number of addresses AD1 to ADq in the first-in-first-out manner, respectively.

When the sensing queue 332 is full, or the number of the output commands enqueued in the sensing queue 332 is greater than a predetermined number (e.g., q), the queue control unit 331 may dequeue the output command of the tail address TA among the output commands enqueued in the sensing queue 332. FIG. 3 exemplarily shows the first typed output command TCMD1 enqueued in the tail address. When the sensing queue 332 is full, the first typed output command TCMD1 of the tail address may be dequeued.

The counter storage unit 333 may store a first count value CNT1 and a second count value CNT2.

The queue control unit 331 increases the first count value CNT1 when the first typed output command TCMD1 is enqueued in the sensing queue 332, and decreases the first count value CNT1 when the first typed output command TCMD1 is dequeued from the sensing queue 332. The queue control unit 331 increases the second count value CNT2 when the second typed output command TCMD2 is enqueued in the sensing queue 332, and decreases the second count value CNT2 when the second typed output command TCMD2 is dequeued from the sensing queue 332.

Accordingly, the first count value CNT1 may represent the number of the first typed output commands enqueued in the sensing queue 332. The number of the first typed output commands enqueued in the sensing queue 332 may correspond to the proportion of the first typed output commands among the output commands which have recently been transmitted through the channel CH. The second count value CNT2 may represent the number of the second typed output commands enqueued in the sensing queue 332. The number of the second typed output commands enqueued in the sensing queue 332 may correspond to the proportion of the second typed output commands among the output commands which have recently been transmitted through the channel CH.

The queue control unit 331 may generate the channel ratio CHR between the first and second typed output commands according to the first and second count values CNT1 and CNT2, which respectively represent the numbers of the first and second typed output commands enqueued in the sensing queue 332, and may provide the channel ratio CHR to the type selection unit 340 according to the first and second count values CNT1 and CNT2. For example, the queue control unit 331 may provide the channel ratio CHR in response to a request signal from the type selection unit 340.

The host command sensor 120 may have a similar configuration to the output command sensing unit 330 described with reference to FIG. 3. In this case, the host command sensor 120 may include a queue control unit, a sensing queue, and a counter storage unit, and the queue control unit may generate the target ratio TGR between the first typed host commands and the second typed host commands according to the first and second count values of the counter storage unit, which respectively represent the numbers of the first and second typed host commands transmitted from the host command receiver 110 to the output command generator 130.

Figure 4:
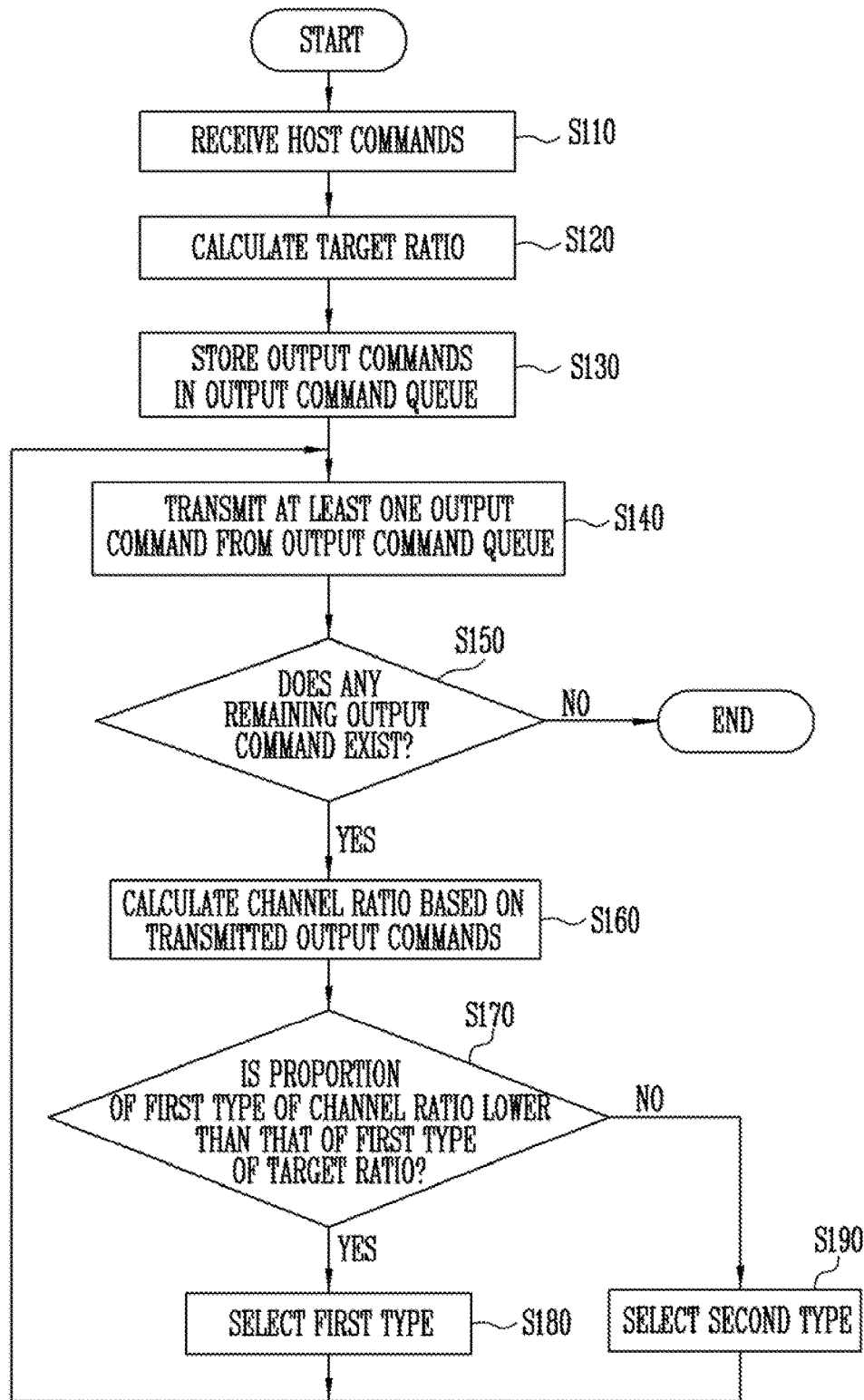
FIG. 4 is a flowchart illustrating an operation of a controller according to an embodiment of the present invention.

FIG. 4 is a flowchart illustrating the operation of the controller 100 according to an embodiment of the present invention.

Referring to FIGS. 1 and 4, at step S110 the host command receiver 110 may receive a plurality of host commands HCMD. At step S120, the host command sensor 120 may generate the target ratio TGR between the first typed host commands and the second typed host commands, which are transmitted from the host command receiver 110 to the output command generator 130. At step S130, the output command generator 130 may generate the output commands TCMD according the host commands HCMD. For example, the output command generator 130 may generate the first and second typed output commands according to the first and second typed host commands, respectively. And then, the output command generator 130 may enqueue the output commands TCMD to the output command queue 140 in the first-in-first-out manner.

At step S140, the arbiter 150 may output the output commands TCMD, which is enqueued in the output command queue 140, to the slave device 10 through the channel CH.

At step S150, the arbiter 150 may determine whether the output command queue 140 is empty. The arbiter 150 may selectively perform step S160 based on the determination of step S150.

At step S160, the arbiter 150 may generate the channel ratio CHR between the first and second typed output commands transmitted to the channel CH as described with reference to FIGS. 2 and 3.

At step S170, the arbiter 150 may compare the channel ratio with the target ratio TGR. The arbiter 150 may determine whether the proportion of the first type of the channel ratio CHR is lower than the target ratio TGR. At step S180, the arbiter 150 may select the first type when the proportion of the first type of the channel ratio is lower than the target ratio TGR. At step S190, the arbiter 150 may select the second type when the proportion of the second type of the channel ratio is lower than the target ratio TGR. Accordingly, the difference between the channel ratio CHR and the target ratio TGR may decrease. As an example, when the proportion of the first type of the channel ratio CHR is 6/10 and the proportion of the first type of the target ratio TGR is 7/10, the first type may be selected. As another example, when the proportion of the first type of the channel ratio CHR is 8/10 and the proportion of the first type of the target ratio TGR is 7/10, the second type may be selected.

Subsequently, the operation may repeat steps S140 to S190 until the output command queue 140 is empty, which is determined at step S150.

Figure 5:
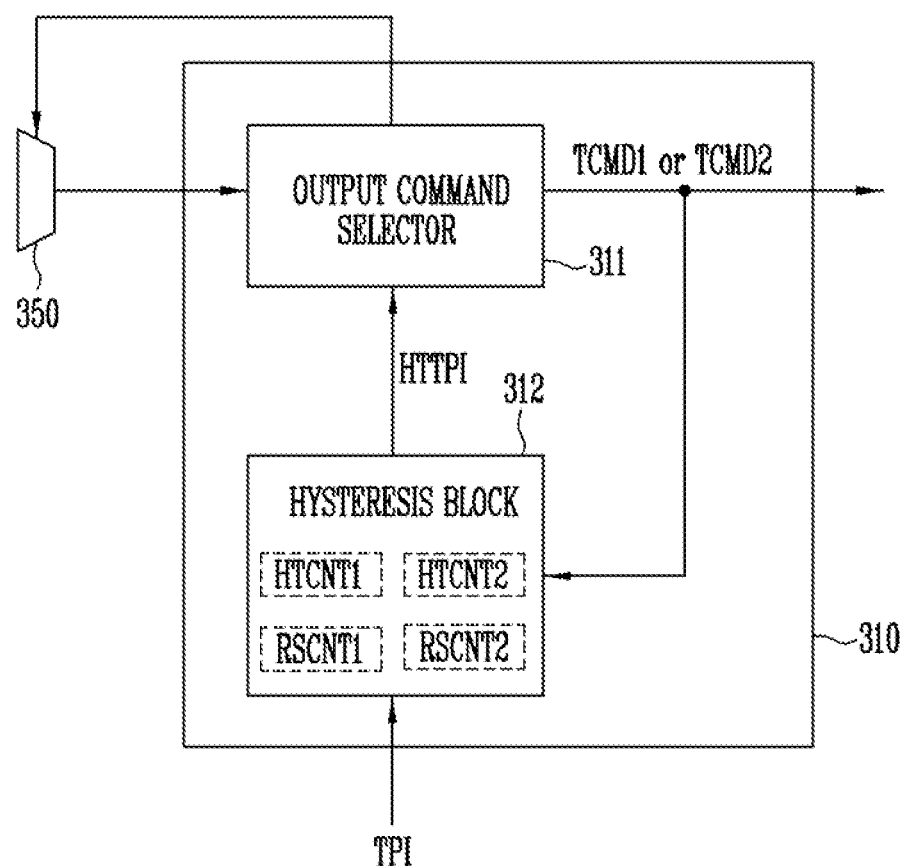
FIG. 5 is a block diagram illustrating an output command selection unit shown in FIG. 2.

FIG. 5 is a block diagram illustrating an embodiment of the output command selection unit 310 shown in FIG. 2.

Referring to FIG. 5, the output command selection unit 310 may include an output command selector 311 and a hysteresis block 312. According to this embodiment, the output command selection unit 310 may selectively transfer one of the first and second typed output commands TCMD1 and TCMD2 from the first and second output command queues 210 and 220 of the output command queue 140 to the channel CH according to hysteresis type information HTTPI provided from the hysteresis block 312.

The hysteresis block 312 may be connected to the output command selector 311. The hysteresis block 312 may receive type information TPI, which indicates the selected one of the first and second type through comparison between the channel ratio CHR and the target ratio TGR by the type selection unit 340. The hysteresis block 312 may monitor the output commands transmitted from the output command queue 140 to the channel CH. For example, each of the output commands transmitted to the channel CH may be one of the first typed output command TCMD1 and the second typed output command TCMD2.

The hysteresis block 312 may store and manage first and second hysteresis counts HTCNT1 and HTCNT2 and first and second reset counts RSCNT1 and RSCNT2 in a separate RAM (not shown).

The hysteresis block 312 may increase the first hysteresis count HTCNT1 when the first typed output command TCMD1 is transmitted from the output command queue 140 to the channel CH, and increase the second hysteresis count HTCNT2 when the second typed output command TCMD2 is transmitted from the output command queue 140 to the channel CH. When each of the first and second hysteresis counts HTCNT1 and HTCNT2 is less than or equal to a predetermined threshold value, the hysteresis block 312 may transfer the type information TPI to the output command selector 311 as the hysteresis type information HTTPI. The output command selector 311 may transfer one of the first and second typed output commands TCMD1 and TCMD2 from the first and second output command queues 210 and 220 of the output command queue 140 to the channel CH according to the hysteresis type information HTTPI.

On the other hand, when any one of the first and second hysteresis counts HTCNT1 and HTCNT2 is greater than the predetermined threshold value, the hysteresis block 312 may control the output command selector 311 such that the first and second typed output commands TCMD1 and TCMD2, which correspond to the hysteresis counts HTCNT1 and HTCNT2 greater than the predetermined threshold value, are not transferred the output command queue 140 to the channel CH, respectively.

When the first hysteresis count HTCNT1 is greater than the predetermined threshold value, the hysteresis block 312 may control the output command selector 311 not to transfer the first typed output command TCMD1 to the channel CH. When the first hysteresis count HTCNT1 is greater than the predetermined threshold value, the hysteresis block 312 may output the hysteresis type information HTTPI representing the second type even though the type information TPI represents the first type. When the first hysteresis count HTCNT1 is greater than the predetermined threshold value and the type information TPI represents the second type, the hysteresis block 312 may output the hysteresis type information HTTPI representing the second type.

When the second hysteresis count HTCNT2 is greater than the predetermined threshold value, the hysteresis block 312 may control the output command selector 311 not to transfer the second typed output command TCMD2 to the channel CH. When the second hysteresis count HTCNT2 is greater than the predetermined threshold value, the hysteresis block 312 may output the hysteresis type information HTTPI representing the first type even though the type information TPI represents the second type. When the second hysteresis count HTCNT2 is greater than the predetermined threshold value, and the type information TN represents the first type, the hysteresis block 312 may output the hysteresis type information HTTPI representing the first type.

The first and second hysteresis counts HTCNT1 and HTCNT2 greater than the predetermined threshold value may mean excessive transmission of the first and second typed output command TCMD1 and TCMD2 to the channel CH, respectively. Through the control of the output command selector 311 with the first and second hysteresis counts HTCNT1 and HTCNT2 by the hysteresis block 312, the controller 100 may prevent excessive transmission of one of the first and second typed output command TCMD1 and TCMD2 to the channel CH.

When one of the first and second hysteresis counts HTCNT1 and HTCNT2 is greater than the predetermined threshold value, the hysteresis block 312 may increase the first reset count RSCNT1 when the first typed output command TCMD1 is transmitted from the output command queue 140 to the channel CH, and increase the second reset count RSCNT2 when the second typed output command TCMD2 is transmitted from the output command queue 140 to the channel CH. When one of the first and second reset counts RSCNT1 and RSCNT2 reaches a specific reference value, the hysteresis block 312 may reset the first and second hysteresis counts HTCNT1 and HTCNT2.

Figure 6:
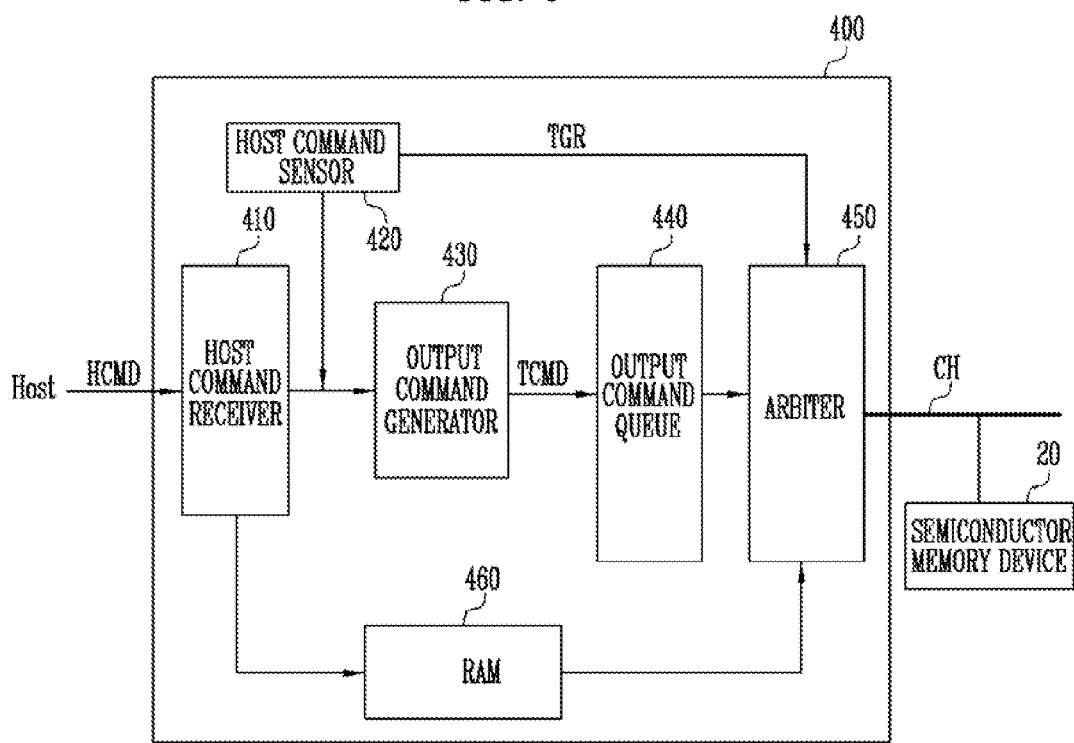
FIG. 6 is a block diagram illustrating a controller according to an embodiment of the present invention.

FIG. 6 is a block diagram illustrating a controller 400 according to an embodiment of the present invention.

Referring to FIG. 6, a semiconductor memory device 20 may be provided as the slave device 10. In an embodiment, the semiconductor memory device 20 may be a flash memory device.

The controller 400 may be the same as the controller 100 described with reference to FIGS. 1 to 5 except for a RAM 460.

The controller 400 may include a host command receiver 410, a host command sensor 420, an output command generator 430, an output command queue 440, an arbiter 450, and a RAM 460. The host command receiver 410, the host command sensor 420, the output command generator 430, the output command queue 440, and the arbiter 450 may be the same as the host command receiver 110, the host command sensor 120, the output command generator 130, the output command queue 140, and the arbiter 150 described with reference to FIGS. 1 to 5, respectively.

Further, the host HOST may provide data to be stored in the semiconductor memory device 20 as well as the host program command. The host command receiver 410 may temporarily store the data to be programmed. The host command may include location information, for example, a logical block address in the RAM 460 for the data to be programmed.

The host command sensor 420 may generate the target ratio TGR between the number of host read commands and the number of host program commands.

When the host command is the host read command, the output command generator 430 may generate an output read command for reading a page in the semiconductor memory device 20. When the host command is the host program command, the output command generator 430 may generate an output program command for programming a page in the semiconductor memory device 20.

In an embodiment, the output command generator 430 may perform a function of a flash translation layer. The output command generator 430 may translate a logical block address included in the host command to a physical block address. When the output command is enqueued in the output command queue 440, the output command generator 430 may store the physical block address, which corresponds to the enqueued output command, in the RAM 460. For example, location information in the RAM 460 for the physical block address, which corresponds to the enqueued output command, may be included in the enqueued output command. When the output command is dequeued from the output command queue 440 to the channel CH, the arbiter 450 may output the physical block address stored in the RAM 460 to the channel CH by referring to the location information in the RAM 460, which is included in the output command for the physical block address. For example, when the output command is the output program command, location information in the RAM 460 for the data to be programmed, which corresponds to the enqueued output program command, may be further included in the enqueued output program command. When the output program command is dequeued from the output command queue 440 to the channel CH, the arbiter 450 may output the data to be programmed as well as the physical block address, which are stored in the RAM 460, to the channel CH by referring to the location information in the RAM 460, which is included, in the output command for the data to be programmed.

According to the embodiment of the present invention, the arbiter 450 generates the channel ratio CHR between the number of the output read and program commands among the output commands TCMD transmitted to the channel CH. The arbiter 450 may compare the channel ratio CHR with the target ratio TGR, and may dequeue and output one of the output read and program commands according to the comparison result.

When assuming that the arbiter 450 may sequentially output the output commands TCMD enqueued in the output command queue 440 without referring to the target ratio TGR, process for the host read command even with priority among the host commands HCMD may be relatively delayed. For example, if the output commands TCMD enqueued in the output command queue 140 are sequentially processed regardless of priority even when the host read command has priority to be processed prior to the host program command, the host HOST may receive data read from the semiconductor memory device 20 or the access result corresponding to the host read command after a lot of time elapses. Therefore, the operating speed of the host HOST may be lowered.

Further, when assuming that the arbiter 450 processes the output read command having priority to be processed prior to the output program command among the output commands TCMD enqueued in the output command queue 440 without referring to the target ratio TGR, as the host commands HCMD are continuously provided, the output read commands enqueued in the output command queue 440 may be processed prior to the output program commands and therefore the output program commands enqueued in the output command queue 440 may accrue. When the number of the output program commands enqueued in the output command queue 440 is greater than a specific reference value, the output program commands may be processed regardless of the priority of the output read commands. In this case, the host HOST may receive data read from the semiconductor memory device 20 or the access result corresponding to the host read command after a lot of time elapses. Therefore, the operating speed of the host HOST may be lowered.

According to an embodiment of the present invention, output read commands and output program commands may be transmitted to the channel CH with reference to the target ratio TGR. That is, the ratio between the output read commands and the output program commands may be adjusted based on the target ratio TGR. Accordingly, the host HOST may quickly acquire data corresponding to the output read command. Thus, the operating speed of the host HOST connected to the controller 400 may be improved.

Figure 7:
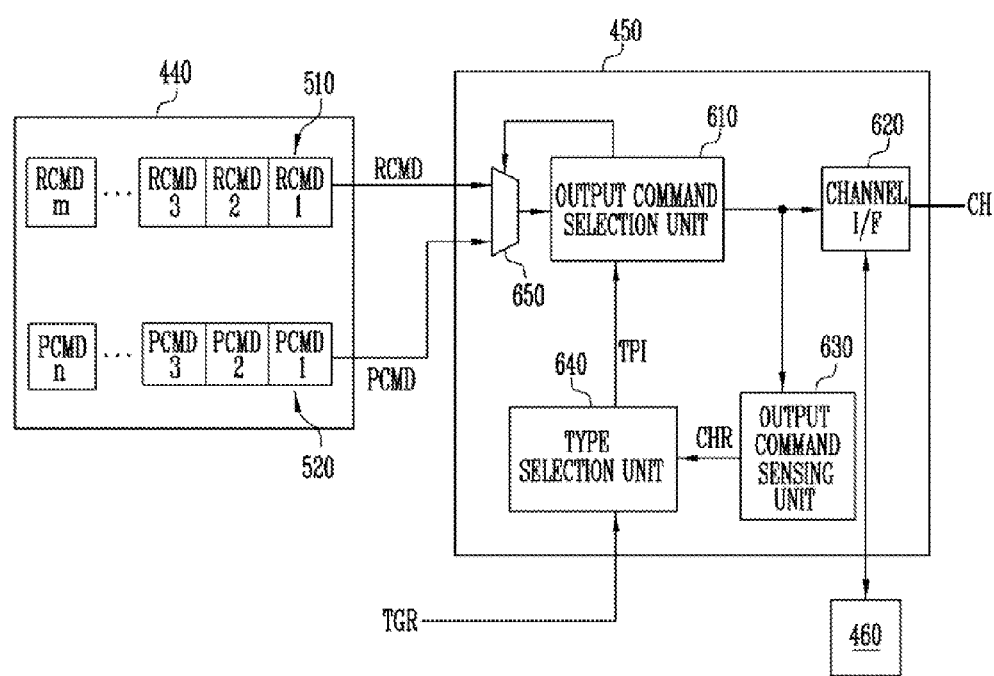
FIG. 7 is a block diagram illustrating an output command queue and an arbiter shown in FIG. 6.

FIG. 7 is a block diagram illustrating the output command queue 440 and the arbiter 450 shown in FIG. 6.

Referring to FIG. 7, the output command queue 440 may include a first output command queue 510 and a second output command queue 520, which may be respectively the same as the first output command queue 210 and the second output command queue 220 described with reference to FIGS. 2 to 5. The first output command queue 510 may store first to m-th output read commands RCMD1 to RCMDm. The second output command queue 520 may store first to n-th output program commands PCMD1 to PCMDn. The first to m-th output read commands RCMD1 to RCMDm and the first to n-th output program commands PCMD1 to PCMDn may correspond to the first to m-th first typed output commands TCMD_1 to TCMD_m and the first to n-th second typed output commands TCMD2_1 to TCMD2_n, respectively.

The arbiter 450 may include a output command selection unit 610, a channel interface 620, an output command sensing unit 630, a type selection unit 640, and a switching unit 650, which may be respectively the same as the output co and selection unit 310, the output command sensing unit 330, the type selection unit 340, and the switching unit 350 described with reference to FIGS. 2 to 5.

The type selection unit 640 may select one of the various types, for example, the first and second types respectively corresponding to the output read command and the output program command, such that the difference between the channel ratio CHR and the target ratio TGR decreases. When a proportion of the first type of the channel ratio CHR is lower than of the target ratio TGR, the type selection unit 640 may select the first type representing the output read command. When a proportion of the second type of the channel ratio CHR is lower than the target ratio TGR, the type selection unit 640 may select the second type corresponding to the output program command. According to the type information TPI from the type selection unit 640 indicating the selected type, the output command selection unit 610 of the arbiter 450 may transmit one of the output read command RCMD and the output program command PCMD, which is received from the output command queue 440 through the switching unit 650, to the channel CH through the channel interface 620.

In an embodiment, the channel interface 620 may further include a function of a direct memory access (DMA). The channel interface 620 may output a corresponding physical block address to the channel CH by accessing the RAM 460 when the output command is output to the channel CH. When the output command transmitted to the channel CH is the output program command, the channel interface 620 may additionally output corresponding data to be programmed to the channel CH by accessing the RAM 460.

Figure 8:
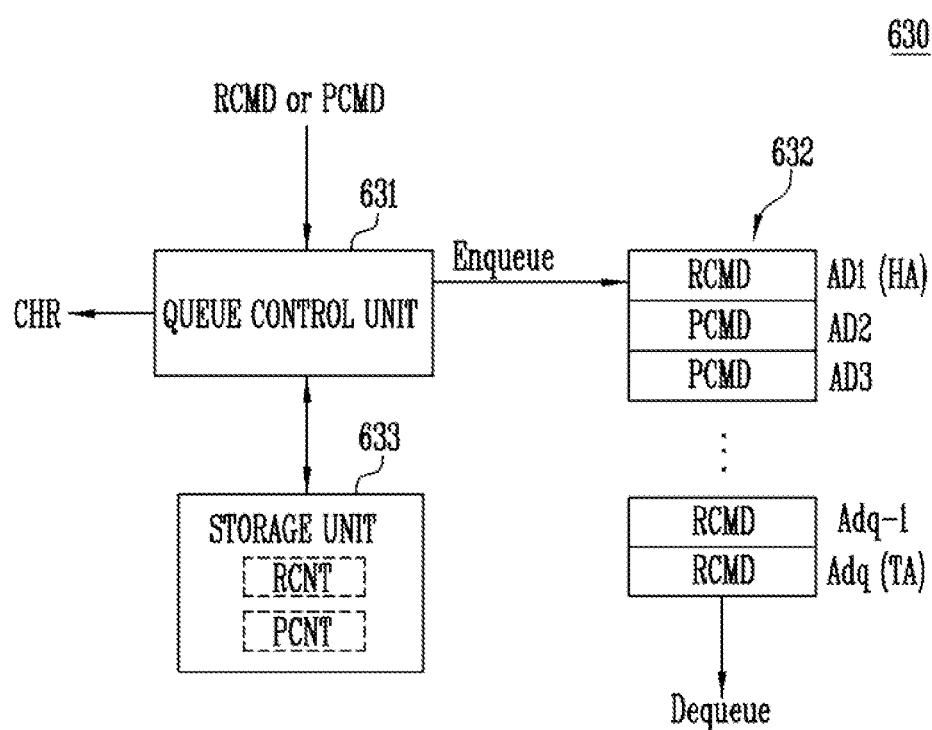
FIG. 8 is a block diagram illustrating an output command sensing unit shown in FIG. 7.

FIG. 8 is a block diagram illustrating the output command sensing unit 630 shown in FIG. 7.

Referring to FIG. 8, the output command sensing unit 630 may include a queue control unit 631, a sensing queue 632, and a counter storage unit 633, which may be respectively the same as the queue control unit 331, the sensing queue 332, and the counter storage unit 333 described with reference to FIGS. 3 to 5. FIG. 8 exemplarily shows the output read commands RCMP and output program command PCMD stored in the sensing queue 632. The counter storage unit 633 may store a read count value RCNT and a program count value PCNT, which may respectively correspond to the first count value CNT1 and the second count value CNT2 described with reference to FIGS. 3 to 5. The queue control unit 631 may increase the read count value RCNT when the output read command RCMD is enqueued, and increase the program count value PCNT when the output program command PCMD is dequeued. The queue unit 631 may decrease the read count value RCNT when the output read command RCMD is dequeued, and decrease the program count value PCMD when dequeued. The queue control unit 331 may generate the channel ratio CHR between the output read and program commands according to the read and program count values RCNT and PCNT, which respectively represent the numbers of the output read and program commands enqueued in the sensing queue 632, and may provide the channel ratio CHR to the type selection unit 640 according to the read and program count values RCNT and PCNT. For example, the queue control unit 631 may provide the channel ratio CHR in response to a request signal from the type selection unit 640.

Figure 9:
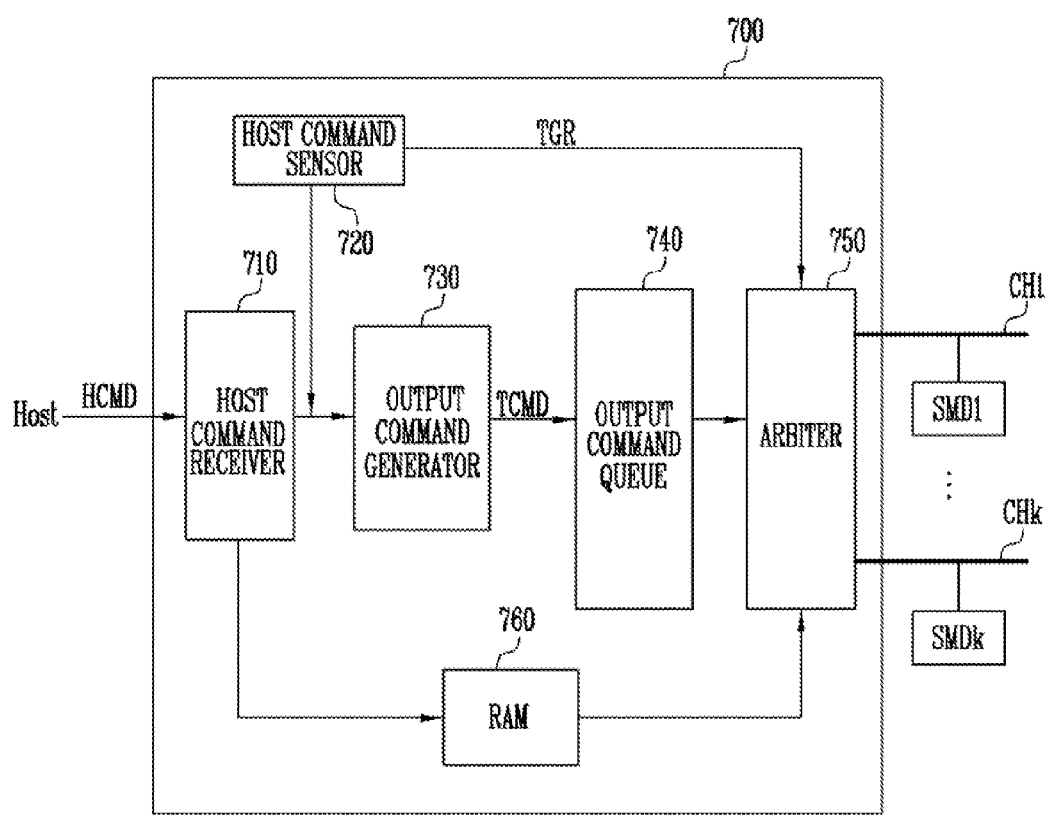
FIG. 9 is a block diagram illustrating a controller according to an embodiment of the present invention.

FIG. 9 is a block diagram illustrating a controller 700 according to an embodiment of the present invention. The controller 700 may be the same as the controller 400 described with reference to FIGS. 6 to 8.

Referring to FIG. 9, a plurality of semiconductor memory devices SMD1 to SDMk may be provided. The controller 700 may be connected to first to kth semiconductor memory devices SMD1 to SDMk through first to kth channels CH1 to CHk.

The controller 700 may include a host command receiver 710, a host command sensor 720, an output command generator 730, an output command queue 740, an arbiter 750, and a RAM 760, which may be the same as the host command receiver 410, the host command sensor 420, the output command generator 430, the output command queue 440, the arbiter 450 and the RAM 460 described with reference to FIGS. 6 to 8, respectively.

Figure 10:
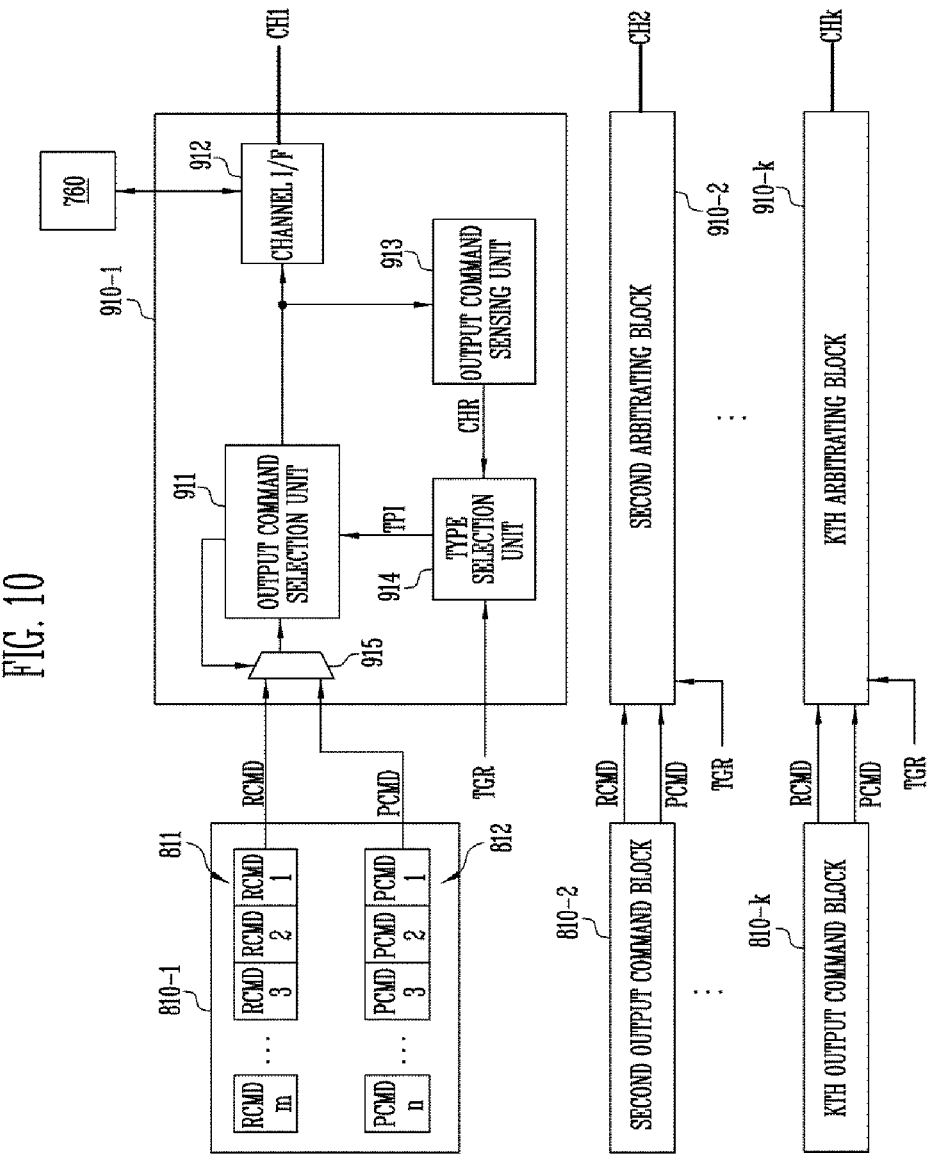
FIG. 10 is a block diagram illustrating an output command queue and an arbiter shown in FIG. 9.

FIG. 10 is a block diagram illustrating the output command queue 740 and the arbiter 750 shown in FIG. 9.

Referring to FIG. 10, first to k-th output command blocks 810-1 to 810-$k$ may be provided for the first to kth channels CH1 to CHk respectively corresponding to the plurality of semiconductor memory devices SMD1 to SDMk. The first to k-th output command blocks 810-1 to 810-$k$ may be included in the output command queue 740 of FIG. 9. Also, first to k-th arbitrating blocks 910-1 to 910-$k$ may be provided for the first to kth channels CH1 to CHk respectively corresponding to the plurality of semiconductor memory devices SMD1 to SDMk. The first to kth arbitrating blocks 910-1 to 910-$k$ may be included in the arbiter 750 of FIG. 9. Each of the first to k-th output command blocks 810-1 to 810-$k$ may be the same as the output command queue 440 described with reference to FIGS. 7 and 8. Each of the first to kth arbitrating blocks 910-1 to 910-$k$ may be the same as the arbiter 450 described with reference to FIGS. 7 and 8.

The first to kth output command blocks 810-1 to 810-$k$ are coupled to the first to kth arbitrating blocks 910-1 to 910-$k$, respectively. The first to kth arbitrating blocks 910-1 to 910-$k$ are coupled to first to kth channels CH1 to CHk, respectively.

Output commands TCMD generated by the output command generator 730 may be distributed to the first to k-th output command blocks 810-1 to 810-$k$. Each of the first to k-th arbitrating blocks 910-1 to 910-$k$ may dequeue the output commands, which are enqueued in a corresponding one of the first to k-th output command blocks 810-1 to 810-$k$, to a corresponding one of the first to k-th channels CH1 to CHk respectively corresponding to the plurality of semiconductor memory devices SMD1 to SDMk.

Each of the arbitrating blocks 910-1 to 910-$k$ may adjust the channel ratio CHR based on the target ratio TGR for each of the first to k-th channels CH1 to CHk respectively corresponding to the plurality of semiconductor memory devices SMD1 to SDMk.

Figure 11:
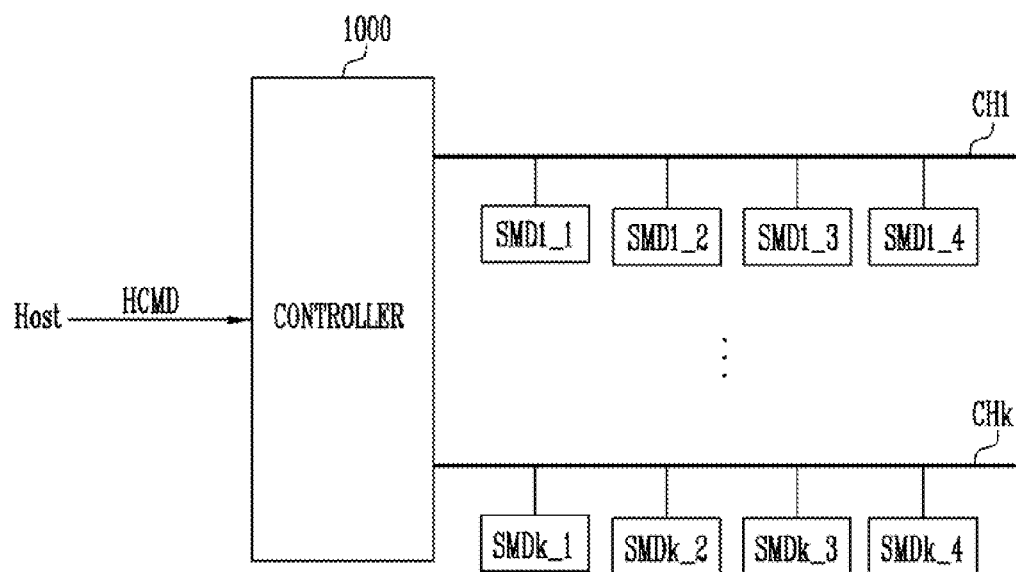
FIG. 11 is a block diagram illustrating a controller according to an embodiment of the present invention.

FIG. 11 is a block diagram illustrating a controller 1000 according to an embodiment of the present invention.

Referring to FIG. 11, each of a plurality of semiconductor memory device groups SMD1_1 to SMD1_4 to SMDk_1 to SMDk_4 may share each of first to k-th channels CH1 to CHk with one another therewithin, respectively. The controller 1000 may be connected to the plurality of semiconductor memory device groups SMD1_1 to SMD1_4 to SMDk_1 to SMDk_4 through the first to k-th channels CH1 to CHk, respectively.

The controller 1000 may communicate with the plurality of semiconductor memory device groups SMD1_1 to SMD1_4 to SMDk_1 to SMDk_4 through the first to k-th channels CH1 to CHk, respectively. The controller 1000 may be the same as the controller 700 described with reference to FIGS. 9 and 10. The controller 1000 may control the semiconductor memory device groups SMD1_1 to SMD1_4 and SMDk_1 to SMDk_4 through the first to kth channels CH1 to CHk, respectively.

Figure 12:
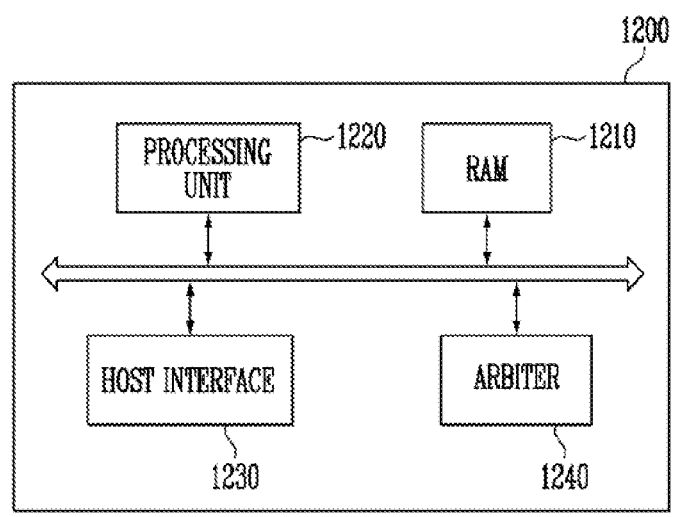
FIG. 12 is a block diagram illustrating a controller according to an embodiment of the present invention.

FIG. 12 is a block diagram illustrating a controller 1200 according to an embodiment of the present invention.

Referring to FIG. 12, the controller 1200 may include a RAM 1210, a processing unit 1220, a host interface 1230, and an arbiter 1240.

The processing unit 1220 controls overall operations of the controller 1200. The RAM 1210 may be used as at least one of an operation memory of the processing unit 1220 and a buffer memory between the slave device 10 and the host HOST. The processing unit 1220 and the RAM 1210 may perform functions of the output command generator 130 and the host command sensor 120 of FIG. 1. In an example, the processing unit 1220 may perform functions of the output command generator 130 and the host command sensor 120 by loading a program command, a data file, a data structure, etc. to the RAM 1210 and executing the loaded data. As another example, the processing unit 1220 and the RAM 1210 may perform a function of the output command generator 130 of FIG. 1, and the host command sensor 120 may be implemented as a separate hardware.

The RAM 1210 may perform the function of the output command queue 140, 440 and 740 described with reference to FIGS. 1 to 11. Additionally, the RAM 1210 may correspond to the RAM 460 and 760 described with reference to FIGS. 6 to 11. FIG. 12 exemplarily shows a single RAM 1210 is provided, but it will be understood that two or more RAMs may be provided.

The host interface 1230 may include a protocol for performing data exchange between the host HOST and the controller 1200. The host interface 1230 may perform a function of the host command receiver 110 of FIG. 1.

The arbiter 1240 may be the same as the arbiter 150, 450 and 750 described with reference to FIGS. 1 to 11.

According to an embodiment of the present invention, a type of an output command to be transmitted through the channel such that the difference between the channel ratio and the target ratio decreases. Accordingly, the host HOST can quickly receive an access result for a host command. Thus, the operating speed of the host HOST connected to the controller 100 can be improved.

Embodiments have been disclosed herein, and although specific terms are employed, they are used and are to be interpreted in a generic and descriptive sense only and not for limiting the scope of the invention. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise, specifically indicated. Accordingly, it will be understood by those of skill in the art that various changes in form and detail may be made without departing from the spirit and scope of the present invention as set forth in the following claims.

What is claimed is:

1. A controller comprising:
a host command receiver suitable for receiving first and second typed host commands from a host, the first typed host commands having a higher priority than the second type host commands;
a host command sensor suitable for counting numbers of first and second typed host commands received by the host command receiver, and generating a target ratio which is a ratio between the numbers of first and second typed host commands;
an output command generator suitable for generating first and second typed output commands respectively corresponding to the first and second typed host commands;
an output command queue suitable for enqueueing the first and second typed output commands; and
an arbiter suitable for transmitting the first and second typed output commands from the output command queue to a channel, counting numbers of first and second typed output commands transmitted from the output command queue to the channel, and generating a channel ratio which is a ratio between the numbers of first and second typed output commands,
wherein the arbiter selects a next output command to be transmitted from the output command queue to the channel among the first typed output commands corresponding to the first typed host commands having a higher priority than the second type host commands, and the second typed output commands corresponding to the second typed host commands, based on a result of a comparison of the channel ratio with the target ratio.

2. The controller of claim 1, wherein the arbiter transmits the first typed output command from the output command queue to the channel when a proportion of the first typed output command of the channel ratio is lower than a proportion of the first typed host command of the target ratio.

3. The controller of claim 1, wherein the arbiter transmits the second typed output command from the output command queue to the channel when a proportion of the second typed output command of the channel ratio is lower than a proportion of the second typed host command of the target ratio.

4. The controller of claim 1, wherein the arbiter transmits one of the first and second typed output commands from the output command queue to the channel such that the difference between the target ratio and the channel ratio decreases.

5. The controller of claim 1,
wherein the channel is connected to one or more semiconductor memory devices, and
wherein the first typed output command corresponds to reading with respect to the semiconductor memory devices, and the second typed output command corresponds to programming with respect to the semiconductor memory devices.

6. The controller of claim 1, wherein the arbiter includes:
an output command selection unit suitable for sequentially transmitting the first and second typed output commands from the output command queue to the channel;
an output command sensing unit suitable for generating the channel ratio by monitoring output commands transmitted from the output command queue to the channel; and
a type selection unit suitable for selecting one of the first and second typed output commands by comparing the channel ratio with the target ratio,
wherein the output command selection unit transmits one of the first and second typed output commands from the output command queue to the channel based on the selection of the type selection unit.

7. The controller of claim 6, wherein the type selection unit selects the first typed output command when a proportion of the first typed output command of the channel ratio is lower than a proportion of the first typed host command of the target ratio.

8. The controller of claim 6, wherein the type selection unit selects the second typed output command when a proportion of the second typed output command of the channel ratio is lower than a proportion of the second typed host command of the target ratio.

9. The controller of claim 6, wherein the output command sensing unit includes:
a sensing queue; and
a queue control unit suitable for enqueueing the output commands, which are transmitted from the output command queue to the channel, to the sensing queue, and dequeueing one of the output commands enqueued in the sensing queue when a number of output commands enqueued in the sensing queue is greater than a predetermined number,
wherein the queue control unit increases a first count value when the enqueued output command is the first typed output command, increases a second count value when the enqueued output command is the second typed output command, decreases the first count value when the dequeued output command is the first typed output command, and decreases the second count value when the dequeued output command is the second typed output command.

10. The controller of claim 9, wherein the queue control unit generates the channel ratio based on the first and second count values.

11. The controller of claim 6, wherein the output command selection unit includes:
a hysteresis block suitable for generating hysteresis type information based on the selection of the type selection unit; and
an output command selector suitable for transmitting one of the first and second typed output commands from the output command queue to the channel according to the hysteresis type information,
wherein the hysteresis block increases a first hysteresis count when the first typed output command is transmitted from the output command queue to the channel, and increases a second hysteresis count when the second typed output command is transmitted from the output command queue to the channel, and
wherein the hysteresis block generates the hysteresis type information representing one of the first and second typed output commands selected by the type selection unit when each of the first and second hysteresis counts is less than or equal to a critical value, generates the hysteresis type information representing the second typed output command when the first hysteresis count is greater than the critical value, and generates the hysteresis type information representing the first typed output command when the second hysteresis count is greater than the critical value.

12. The controller of claim 11,
wherein, when one of the first and second hysteresis counts becomes greater than the critical value, the hysteresis block increases a first reset count when the first typed output command is transmitted from the output command queue to the channel, and increases a second reset count when the second typed output command is transmitted from the output command queue to the channel, and
wherein the hysteresis block resets the first and second hysteresis counts when one of the first and second reset counts reaches a reference value.

13. A controller comprising:
a host command receiver suitable for receiving various typed host commands from a host, the various typed host commands having different priorities from each other;
a host command sensor suitable for counting a total number of the various typed host commands received by the host command receiver and a number of each typed host commands for the received various typed host commands, and generating a target ratio which is a ratio of the number of each typed host commands to the total number of the various typed host commands;
an output command queue suitable for enqueueing various typed output commands respectively corresponding to the various typed host commands; and
an arbiter suitable for transmitting the various typed output commands from the output command queue to a channel, counting a total number of the various typed output commands transmitted from the output command queue to the channel and a number of each typed output commands for the transmitted various typed output commands and generating a channel ratio which is a ratio of the number of each typed output commands to the total number of the various typed output commands,
wherein the arbiter selects a next output command to be transmitted from the output command queue to the channel among the various typed output commands corresponding to the various typed host commands having different priorities from each other, based on a result of a comparison of the channel ratio with the target ratio.

14. The controller of claim 13, wherein the arbiter transmits a first typed output command from the output command queue to the channel when a proportion of the first typed output command of the channel ratio is lower than a proportion of the first typed host command of the target ratio.

15. The controller of claim 13, wherein the arbiter transmits one of the various typed output commands from the output command queue to the channel such that the difference between the target ratio and the channel ratio decreases.

16. The controller of claim 13,
wherein the channel is connected to one or more semiconductor memory devices, and
wherein the various typed output commands include a first typed output command corresponding to reading with respect to the semiconductor memory devices, and a second typed output command corresponding to programming with respect to the semiconductor memory devices.

17. The controller of claim 13, wherein the arbiter includes:
an output command selection unit suitable for sequentially transmitting the various typed output commands from the output command queue to the channel;
an output command sensing unit suitable for generating the channel ratio by monitoring each typed output commands transmitted from the output command queue to the channel; and
a type selection unit suitable for selecting one of the various typed output commands by comparing the channel ratio with the target ratio,
wherein the output command selection unit transmits one of the various typed output commands from the output command queue to the channel based on the selection of the type selection unit.

18. The controller of claim 17, wherein the type selection unit selects a first typed output command when a proportion of the first typed output command of the channel ratio is lower than a proportion of a first typed host command of the target ratio.

19. The controller of claim 17, wherein the output command selection unit includes:
a hysteresis block suitable for generating hysteresis type information based on the selection of the type selection unit; and
an output command selector suitable for transmitting one of the various typed output commands from the output command queue to the channel according to the hysteresis type information,
wherein the hysteresis block increases each of plural hysteresis counts respectively corresponding to the various typed output commands when each typed output command is transmitted from the output command queue to the channel, and
wherein the hysteresis block generates the hysteresis type information representing one of the various typed output commands selected by the type selection unit when each of the plural hysteresis counts is less than or equal to a critical value, and generates the hysteresis type information representing a second typed output command when one of the plural hysteresis counts corresponding to a first typed output command is greater than the critical value.

20. A method of operating a controller, the method comprising:
receiving various typed host commands from a host;
counting a total number of the various typed host commands and a number of each typed host commands for the various typed host commands, the various typed host commands having different priorities from each other;
generating a target ratio which is a ratio of the number of each typed host commands to the total number of the various typed host commands;
enqueueing various typed output commands respectively corresponding to the various typed host commands;
transmitting the various typed output commands from an output command queue to a channel;
counting a total number of the various typed output commands transmitted from the output command queue to the channel and a number of each typed output commands for the transmitted various typed output commands;

generating a channel ratio which is a ratio of the counted number of each typed output command to the total number of the various typed output commands transmitted from the output command queue to the channel; and selecting a next output command to be transmitted from the output command queue to the channel among the various typed output commands corresponding to the various typed host commands having different priorities from each other, based on a result of a comparison of the channel ratio with the target ratio.

\* \* \* \* \*